United States Patent
Lasseter et al.

(10) Patent No.: US 7,116,010 B2
(45) Date of Patent: Oct. 3, 2006

(54) CONTROL OF SMALL DISTRIBUTED ENERGY RESOURCES

(75) Inventors: Robert H. Lasseter, Madison, WI (US); Paolo Piagi, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 588 days.

(21) Appl. No.: 10/245,729

(22) Filed: Sep. 17, 2002

(65) Prior Publication Data

US 2004/0051387 A1    Mar. 18, 2004

(51) Int. Cl.
*H02J 1/12* (2006.01)
*G05F 1/70* (2006.01)

(52) U.S. Cl. ............................ 307/45; 307/84; 323/207

(58) Field of Classification Search ............... 307/45, 307/84; 323/207
See application file for complete search history.

(56) References Cited

U.S. PATENT DOCUMENTS

| | | | |
|---|---|---|---|
| 5,041,959 A * | 8/1991 | Walker ........................ 363/79 |
| 5,329,222 A * | 7/1994 | Gyugyi et al. .............. 323/207 |
| 5,596,492 A * | 1/1997 | Divan et al. .................. 363/95 |
| 5,614,770 A * | 3/1997 | Suelzle ....................... 307/105 |
| 5,745,356 A * | 4/1998 | Tassitino et al. ............. 363/71 |
| 6,111,764 A * | 8/2000 | Atou et al. .................... 363/37 |
| 6,188,205 B1 * | 2/2001 | Tanimoto et al. .......... 323/205 |
| 6,219,591 B1 | 4/2001 | Vu et al. |
| 6,219,623 B1 | 4/2001 | Wills |
| 6,249,411 B1 | 6/2001 | Hemena et al. |
| 6,252,310 B1 | 6/2001 | Wilhelm |
| 6,285,917 B1 | 9/2001 | Sekiguchi et al. |
| 6,288,456 B1 | 9/2001 | Cratty |
| 6,347,027 B1 | 2/2002 | Nelson et al. |
| 6,356,471 B1 | 3/2002 | Fang |
| 6,359,423 B1 * | 3/2002 | Noro ........................ 323/208 |
| 6,465,910 B1 | 10/2002 | Young et al. |
| 6,870,279 B1 * | 3/2005 | Gilbreth et al. .............. 290/52 |
| 2003/0036806 A1 | 2/2003 | Schienbein et al. |

OTHER PUBLICATIONS

Robert Lasseter, Kevin Tomsovic, and Paolo Piagi. "Scenerios for Distributed Technology Applications with Steady State and Dynamic Models of Loads and Micro-Sources," Consortium for Electric Reliability Technology Solutions. Apr. 14, 2000.*

Robert Lasseter et al. "White Paper on Integration of Distributed Energy Resources The CERTS MicroGrid Concept," Consortium for Electric Reliability Technology Solutions. Apr. 2002.*

(Continued)

*Primary Examiner*—Brian Sircus
*Assistant Examiner*—Brett Squires
(74) *Attorney, Agent, or Firm*—Foley & Lardner LLP

(57) ABSTRACT

A power electronics interface in a microsource controller allows efficient connection in a power system of small, low cost and reliable distributed generators such as microturbines, fuel cells and photovoltaic. Power electronics provide the control and flexibility to insure stable operation for large numbers of distributed generators. The power electronics controls are designed to insure that new generators can be added to the system without modification of existing equipment. A collection of sources and loads can connect to or isolate from the utility grid in a rapid and seamless fashion, each inverter can respond effectively to load changes without requiring data from other sources, and voltage sag and system imbalances can be corrected.

23 Claims, 14 Drawing Sheets

OTHER PUBLICATIONS

Lasseter, R.H.; "MicroGrids," Power Engineering Society Winter Meeting, 2002. IEEE vol. 1, Jan. 27-31, 2002 pp. 305-308 vol. 1.*
Bob Lasseter. "MicroGrid Proof of Concept," Consortium for Electric Reliability Technology Solutions. CEC Meeting. Jun. 21, 2001.*
Robert Lasseter, et al., "Integration of Distributed Energy Resources The CERTS MicroGrid Concept," Consortium for Electric Reliability Technology Solutions, Apr. 2002, pp. 1-2097.
R.H. Lasseter, "MicroGrids," IEEE, No. 0-7803-7322, Jul. 2002, pp. 305-308.
DOE News, The DER Weekly, vol. 2, No. 10, Mar. 9, 2001, pp. 1-4.
Lasseter, "Dynamic Models for Micro-Turbines and Fuel Cells," Panel on Modeling New Forms of Generation & Storage for Stability Analysis, CERTS, Jul. 17, 2001.
Lasseter, "Operation and Control of Micro-Grids," HICSS-34, Lecture 14, Jan. 3-6, 2001 (part 2).
Lasseter, "MicroGrid Concept," IEEE Winter Meeting, Jan. 31, 2001.
Lasseter, "Distributed Energy Resources & Micro Grids," T&D Committee, Jul. 20, 2000.
Lasseter, et al., "Analysis of Distributed Generation Systems," IAB Meeting, Denver, Colorado, Fall 2000.
Lasseter, "Distributed Energy Resources & Power Electronics," DOE/ORNL, Oct. 26, 2000.
Lasseter, "Micro Grids and Distributed Resources," Oct. 1999.
Lasseter, et al., "Micro-Grid Operation and Control," HICSS-34, Lecture 14, Jan. 3-6, 2001. (part 1)].
Lasseter, et al., "Integration of Distributed Energy Resources—Micro Grids," CERTS, Mar. 2000.
Lasseter, et al., "Reliability, DER & Micro Grids," EPRI's Sixth Annual Distributed Resources Conference, Oct. 5, 2000.
Lasseter, "Integration of Distributed Energy Resources—Scenerios & Models," CERTS, Apr. 2000.

* cited by examiner

CONTROL OF SMALL DISTRIBUTED ENERGY RESOURCES

STATEMENT REGARDING GOVERNMENT RIGHTS

This invention was made with United States government support awarded by the following agencies:
DOE DE-AC36-99-G010337
NSF EEC-0119230

The United States government has certain rights in this invention.

FIELD OF THE INVENTION

The present invention relates generally to power systems, including distributed energy resources (DER) systems and methods. More particularly, the present invention relates to control of small distributed energy resources.

BACKGROUND OF THE INVENTION

Construction of new large power generating plants has not kept pace with growing electricity demand. For example, in the western and northeastern regions of the United States, electricity demand has outpaced supply from power generating plants. At the same time, customer demand for even more highly reliable power is growing across the nation. Even if a sufficient number of new generating plants were built, the country's aging transmission and distribution systems are unlikely to reliably deliver the increased power supply that is needed. Moreover, the cost of the upgrades required to enable today's power system to deliver the level of reliability being demanded is far in excess of what society has so far been willing to bear.

In this context, distributed energy resources (DER), small power generators typically located at customers sites where the energy they generate is used, have emerged as a promising option to meet customers current and future demands for increasingly more reliable electric power. DER can include electricity generators, energy storage, load control, and, for certain classes of systems, advanced power electronic interfaces between the generators and the distribution grid.

DER systems range in size and capacity from a few kilowatts up to 50 MW. They comprise a variety of technologies, both supply-side and demand-side, that can be located at or near the location where the energy is used.

DER devices can provide opportunities for greater local control of electricity delivery and consumption. They also enable more efficient utilization of waste heat in combined heat and power (CHP) applications boosting efficiency and lowering emissions. CHP systems can provide electricity, hot water, heat for industrial processes, space heating and cooling, refrigeration, and humidity control to improve indoor air quality and comfort.

Current trends in DER are toward small technologies. One DER technology is small gas-fired microturbines in the 25–100 kW range, which many expect can be mass produced at low cost. These devices—which are high-speed (50,000–100,000 rpm) turbines with air foil bearings—are designed to combine the reliability of on-board commercial aircraft generators with the low cost of automotive turbochargers. Microturbines rely on power electronics to interface with loads. Example products include: Allison Engine Company's 50-kW generator, Capstone's 30-kW and 60-kW systems, and Honeywell's 75-kW Turbogenerator.

Fuel cells are also well suited for distributed generation applications. They offer high efficiency and low emissions but are currently expensive. Phosphoric acid cells are commercially available in the 200 kW range, and solid-oxide and molten-carbonate cells have been demonstrated. A major development effort by automotive companies has focused on the possibility of using gasoline as a fuel for polymer electrolyte membrane (PEM) fuel cells. In 1997, Ballard Generation Systems formed a strategic alliance with Daimler-Benz and Ford to develop new vehicle engines using Ballard's PEM fuel cell. Fuel cell costs for these engines are expected to be $200 per kW. Fuel cell engine designs are attractive because they promise high efficiency without the significant polluting emissions associated with internal combustion engines. Many other major international companies are investing in fuel cells, including General Motors, Chrysler, Honda, Nissan, Volkswagen, Volvo, and Matsushita Electric.

Microturbines and fuel cells are a major improvement over conventional combustion engines in their emissions of ozone, particulate matter less 10 µm in diameter (PM-10), nitrogen oxide (NOx), and carbon monoxide (CO). The primary fuel for microsources is natural gas, which has few particulates and less carbon than most traditional fuels for combustion engines.

Microsources that effectively use waste heat can have CO emissions as low as those of combined-cycle generators. NOx emissions are mainly a consequence of combustion. Some traditional combustion fuels, notably coal, contain nitrogen that is oxidized during the combustion process. However, even fuels that contain no nitrogen emit NOx, which forms at high combustion temperatures from the nitrogen and oxygen in the air. Gas turbines, reciprocating engines, and reformers all involve high temperatures that result in NOx production. Microturbines and fuel cells have much lower NOx emissions because of their lower combustion temperatures.

Distributed resources include more than microturbines and fuel cells. Storage technologies such as batteries, ultracapacitors, and flywheels are important. Combining storage with microsources provides peak power and ride-through capabilities during system disturbances. Storage systems have become far more efficient than they were five years ago. Flywheel systems can deliver 700 kW for five seconds, and 28-cell ultracapacitors can provide up to 12.5 kW for a few seconds.

There is a significant potential for smaller DER (e.g., <100 kW/unit) with advanced power electronic interfaces which can be manufactured at a low cost, have low emissions, and be placed near the customers load to make effective use of waste heat, sometimes called microsources.

In general, there are two basic classes of microsources: DC sources, such as fuel cells, photovoltaic cells, and battery storage; and high-frequency AC sources, such as microturbines and wind turbines, which need to be rectified. In both of these classes of microsources, the DC voltage that is produced is converted to AC voltage or current at the required frequency, magnitude, and phase angle. In most cases, the conversion is performed by a voltage inverter that can rapidly control the magnitude and phase of its output voltage. Fundamental frequency in an inverter is created using an internal clock that does not change as the system is loaded. This arrangement is very different from that of synchronous generators for which the inertia from spinning mass determines and maintains system frequency. Inverter-based microsources, by contrast, are effectively inertia-less. As a result, basic system problems include controlling the power feeder from the grid, the microsource's response speed, the sharing and tracking of loads among the distributed resources, the reactive power flow, the power factor, and the system's steady-state and transient stability cannot be achieved using methods developed over time for synchronous generators.

Heretofore, adding a microsource to a distributed energy resource (DER) system has required modifying existing equipment in the system. Further, conventional control of microsources in such a system has been dependent on control of units already in the system. As such, power from a microsource in a DER system has not been independently controlled.

Thus, there is a need for microsource controls to insure that new microsources can be added to the system without modification of existing equipment, sources can connect to or isolate from the utility grid in a rapid and seamless fashion, reactive and active power can be independently controlled, and voltage sag and system imbalances can be corrected. Further, there is a need for control of inverters used to supply power based on information available locally at each inverter. Yet further, there is a need for a local controller at the microsource to enable "plug and play" operation of the microsource. In other words, there is a need to add microsources to a distributed energy resource system without changes to the control and protection of units that are already part of the system.

SUMMARY OF THE INVENTION

In accordance with the invention, a microsource system provides power in any one of an isolation mode and a grid mode and is configured to couple to a power system without modification of existing equipment in the power system. The microsource system can include a microsource power source configured to provide electrical power and a controller coupled to the microsource power source to control the microsource power source based only on information available locally at the microsource power source.

The invention may be embodied in a microsource system configured for use in a microgrid which is capable of separation from a power grid while continuing to operate independently when power grid problems occur and reconnecting to the power grid once the problems are solved. The system can include a microsource including a prime mover, a DC interface, and a voltage source inverter; means for controlling real and reactive power coupled to the microsource; and means for regulating voltage through droop control to the microsource.

A power system in accordance with the invention can include a microsource and a controller. The microsource includes a voltage source inverter and is configured to connect to a utility grid. The utility grid couples a plurality of power sources. The controller is coupled to the voltage source inverter and is configured to control reactive and active power independently from the plurality of power sources coupled to the utility grid.

A microsource can be controlled in a microgrid system such that the microgrid can operate independently from a power grid or in cooperation with the power grid. The method of operation can include receiving inputs from voltage at a connection point, current injected by the microsource, and current in a feeder from a utility supply. The method reduces a local voltage set point as current injected by the microsource becomes more capacitive and increases the local voltage set point as current generated by the microsource becomes more capacitive.

Other objects, features and advantages of the invention will become apparent to those skilled in the art upon review of the following drawings, the detailed description, and the appended claims.

DETAILED DESCRIPTION OF EXEMPLARY EMBODIMENTS

In the following description, for purposes of explanation, numerous specific details are set forth to provide a thorough understanding of exemplary embodiments of the invention. It will be evident, however, to one skilled in the art that the invention may be practiced without these specific details. In other instances, structures and devices are shown in block diagram form to facilitate description of the exemplary embodiments.

In some embodiments, hardwired circuitry may be used in place of, or in combination with, software instructions to implement the functions described. Thus, the embodiments described herein are not limited to any specific combination of hardware circuitry and software, nor to any particular source for the instructions executed by a computerized control system.

Exemplary embodiments of a system for and method of control of small distributed energy resources are described below. These exemplary embodiments can include distributed generators controlled by power electronics. The power electronics controls can be designed to insure that: (1) new generators can be added to the system without modification of existing equipment; (2) a collection of sources and loads can connect to or isolate from the utility grid in a rapid and seamless fashion; (3) each inverter can respond effectively to load changes without requiring data from other sources; and (4) voltage sag and system imbalances can be corrected.

The system and method for control of small distributed energy resources can be implemented in a wide variety of different ways. Various embodiments may include, for example, DC sources or AC sources. The invention is not limited to a particular embodiment, but extends to various modifications, combinations, and permutations within the scope of the appended claims.

Figure 1:
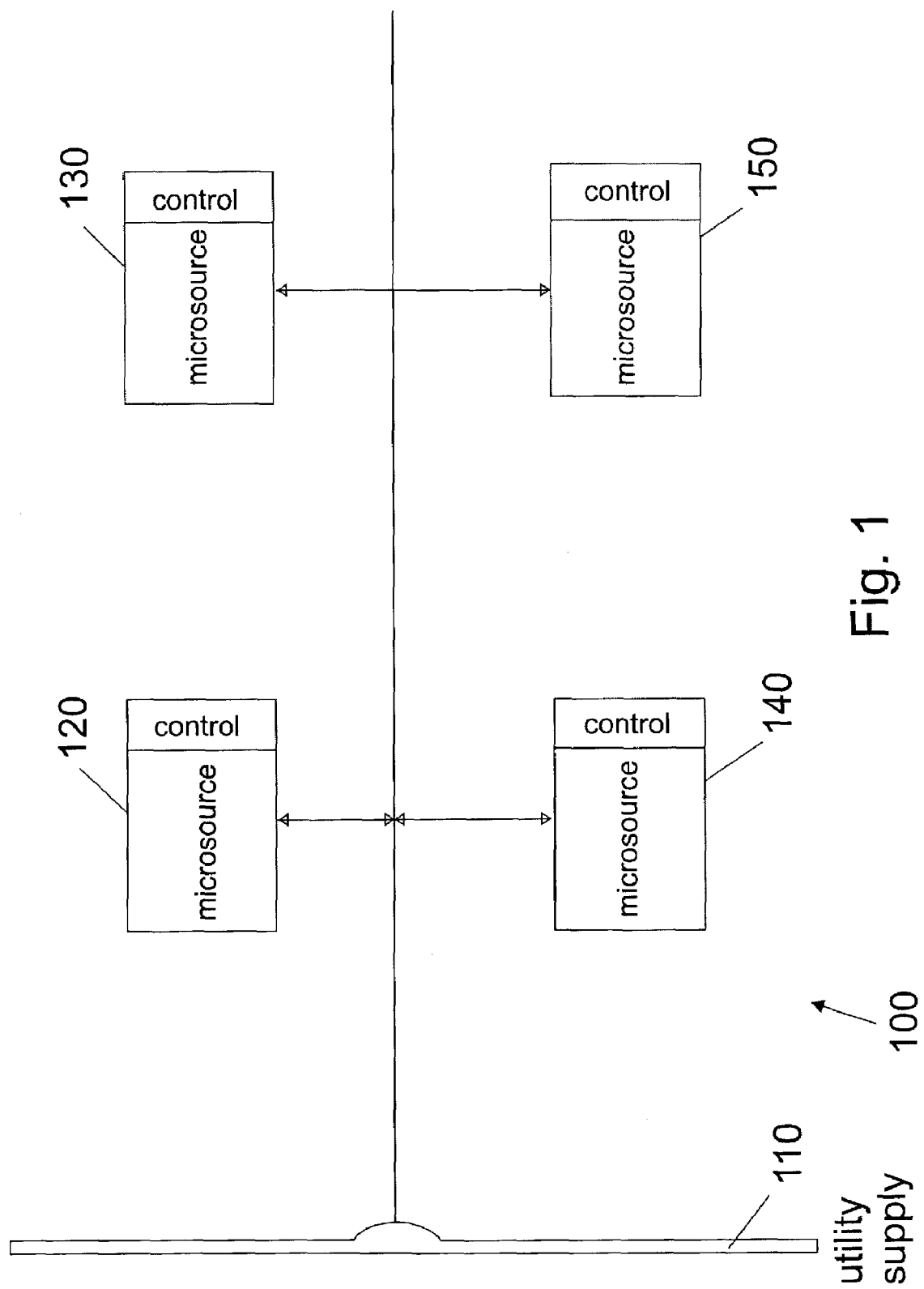
FIG. 1 is a diagrammatic representation of a distributed energy resource system in accordance with an exemplary embodiment.

FIG. 1 illustrates a power distribution system 100 including a utility supply 110 and microsource systems 120, 130, 140, and 150. The utility supply 110 can include a power network or power grid coupling multiple machines or units that utilize power from the utility supply 110. The utility supply 100 can be included in a distributed energy resource (DER) system in which the utility supply 110 connects units distributed throughout the DER system.

The microsource systems 120, 130, 140, and 150 include exemplary microsource power sources and controllers. By way of example, the microsource system 120 can include a power source, such as a fuel cell, battery, or microturbine. Controllers in the microsource systems 120, 130, 140, and 150 can provide control to power sources. In more than one exemplary embodiment, microsource controllers can provide control to inverter interfaces found in microsource power sources.

Advantageously, the system 100 includes clusters of microsources and storage designed to operate both in isolation and connected to the power grid or utility supply 110. When the microsources operate in isolation, load—tracking problems can arise because microturbines and fuel cells respond slowly (with time constants ranging from 10 to 200 seconds) and are inertia—less. Conventional utility power systems have storage in the form of generators inertia. When a new load comes on-line, the initial energy balance is satisfied by the system's inertia, which results in a slight reduction in system frequency. A microsource does not rely on generators inertia, providing power storage to insure initial energy balance.

System storage for island operation can come in several forms: batteries or super-capacitors on the DC bus for each microsource; direct connection of AC storage devices (batteries, flywheels etc.); or use of traditional generation with inertia along with microsource generators. In an exemplary embodiment, if the system 100 is not required to operate in island mode, the energy imbalance can be met by the AC system, and storage is not necessary.

In at least one of the exemplary embodiments, microsource controller techniques described below rely on inverter interfaces found in fuel cells, photovoltaic panels, microturbines, windturbines, and storage technologies. Advantageously, communication among microsources is unnecessary for basic system control. Each inverter responds effectively to load changes without requiring data from other sources or locations.

Figure 2:
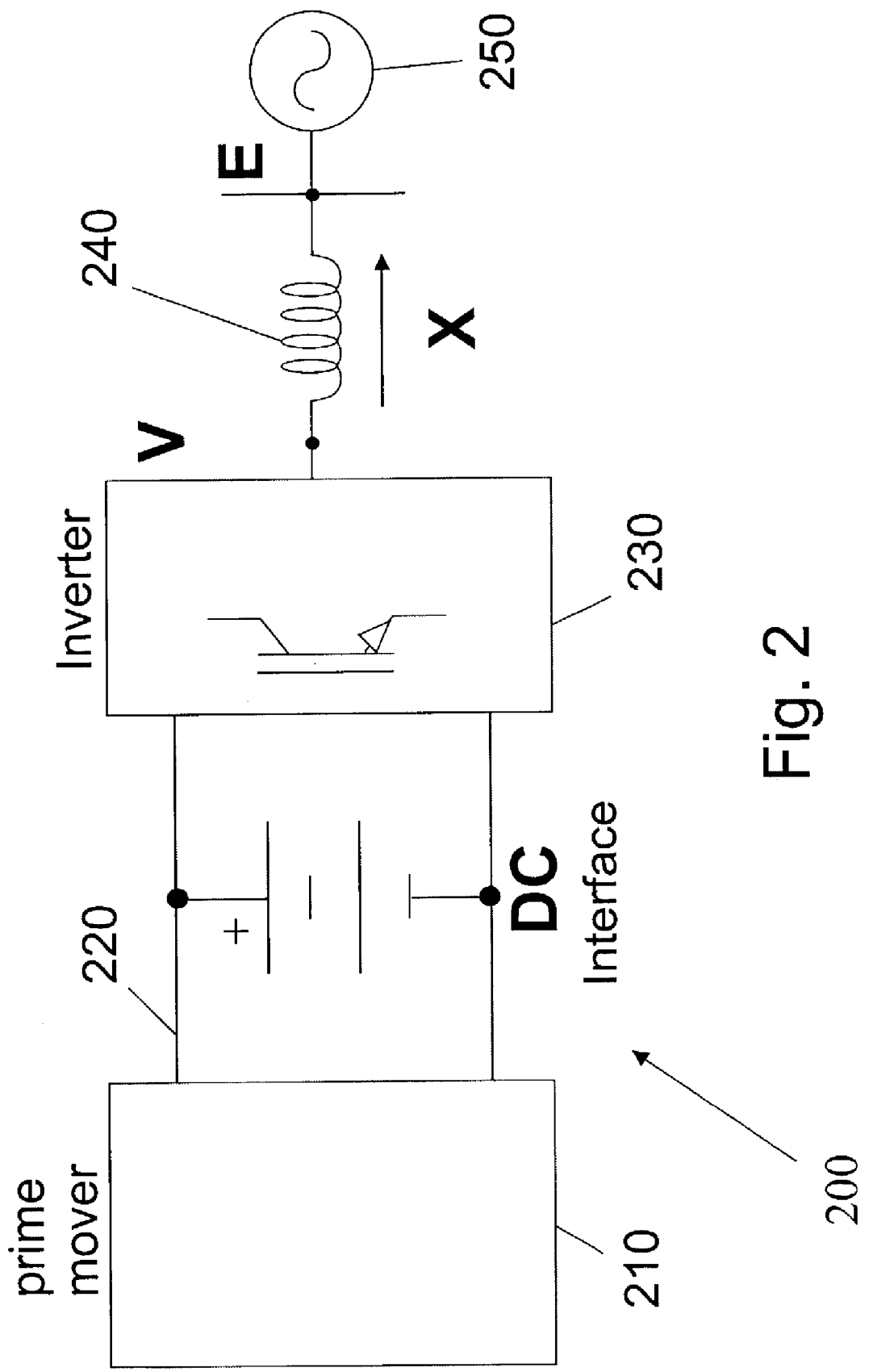
FIG. 2 is a diagrammatic representation of an exemplary microsource included in the distributed energy resource system of FIG. 1.

FIG. 2 illustrates a microsource 200 in accordance with an exemplary embodiment. The microsource 200 can include a prime mover 210, a DC interface 220, and a voltage source inverter 230. The prime mover 210 can be a fuel cell, microturbine, PV, or windturbine. The time constants of changes in power output for the prime mover 210 can range from 10 to 200 seconds. This response speed requires that either the AC system or DC bus has adequate storage to insure fast load tracking.

The microsource 200 couples to a power system 250 using an inductor 240. The voltage source inverter 230 controls both the magnitude and phase of its output voltage, V. The vector relationship between the inverter voltage, V, and the system voltage, E, along with the reactance, X, of the inductor 240 determines the flow of real and reactive power (P &Q) from the microsource 200 to the system 250.

P & Q magnitudes are determined as shown in the equations (1), (2), and (3) below. For small changes, P is predominantly dependent on the power angle, $\delta_p$, and Q is dependent on the magnitude of the voltage, V, of the inverter 230. These relationships constitute a basic feedback loop for the control of output power and bus voltage, E, through regulation of reactive power flow.

$$P = \frac{3}{2}\frac{VE}{X}\sin\delta_p \qquad \text{Eq. (1)}$$

$$Q = \frac{3}{2}\frac{V}{X}(V - E\cos\delta_p) \qquad \text{Eq. (2)}$$

$$\delta_p = \delta_V - \delta_E \qquad \text{Eq. (3)}$$

Advantageously, the inverter 230 supplies power to an AC system in a distributed environment and has controls that are only based on information available locally at the inverter 230. In a system with many microsources such as the system 100 described with reference to FIG. 1, communication of information between machines or units is impractical. As such, control of the inverter 230 is based on terminal quantities. Control of the frequency of the inverter 230 dynamically controls the power angle and the flow of the real power. To prevent overloading the inverter 230 and the microsources, load changes are taken up by the inverter 230 in a predetermined manner, without communication.

Figure 3:
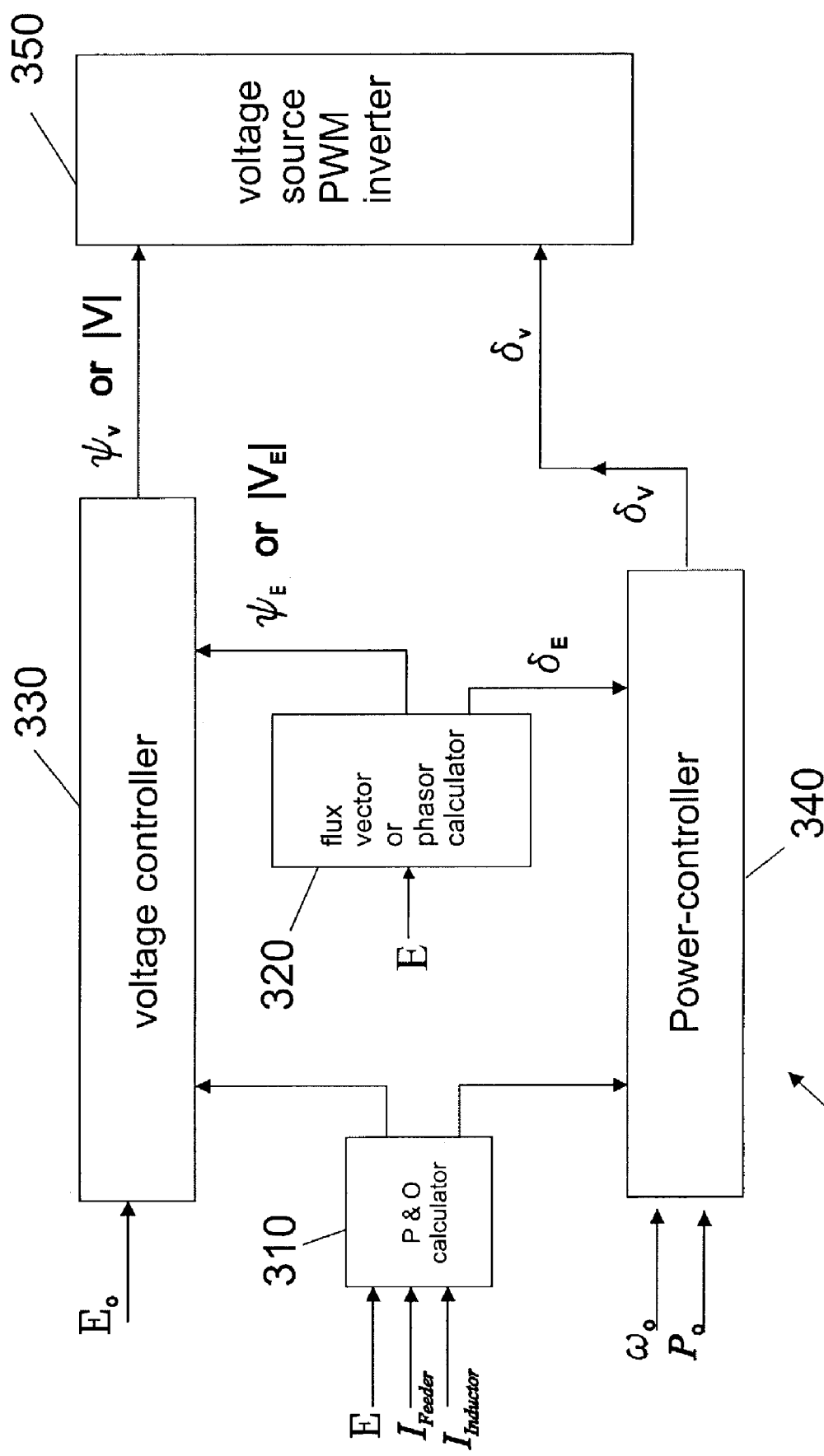
FIG. 3 is a diagrammatic representation of an inverter control system included in the distributed energy resource system of FIG. 1.

FIG. 3 illustrates an inverter control system 300 in which each microsource provides a real and reactive power (P&Q) calculator 310, a flux vector or phasor calculator 320, a voltage controller 330, a power controller 340, and an inverter 350. Exemplary input and outputs to the controller can include three set points and three measured states. Set points can include $E_o$: the desired voltage value; $P_o$: the desired power flow from the microsource or distribution feeder; and $\omega_o$: the fundamental frequency. Measured states can include E: time varying voltage at a connection point; $I_{inductive}$: time varying current injected by the microsource; and $I_{feeder}$: time varying current in feeder. Two variables that are directly output to the inverter 350 are the magnitude and phase of the voltage flux, $\Psi_v$, or the requested voltage V.

The P & Q calculator 310 can have three inputs: E, $I_{inductive}$, and $I_{feeder}$ which are used to calculate the real power, P, and the reactive power, Q. Real power can be either the power being injected by the microsource using the inductor current, $I_{inductive}$, or the power in the utility feeder using the feeder current, $I_{feeder}$. The reactive power is the Q being injected by the microsource.

The flux vector or phase calculator 320 calculates the instantaneous magnitude and phase of the system voltage, E, at the point where the microsource is connection. This calculation can be achieved through standard d–q methods or by using voltage flux techniques. Normally, it can be more stable to control the flux of the voltage, rather than the actual voltage. This continuous quantity is the time-integral of the inverter output voltage, often called the flux vector $\psi_E$:

$$\psi_E(t) = \psi_E(t_O) + \int_o^t E\, d\tau \qquad \text{Eq. (4)}$$

Three phase input phase voltages, E, can be transformed to the stationary d-q reference frame. The resulting d–q components are time integrated, resulting in the flux vector, $\Psi_e$, for the AC system voltage.

Two variables that are directly input to the inverter 350 are the magnitude and phase of the flux $\Psi_v$, or the magnitude and phase of the voltage $\overline{V}$. The vector $\overline{\Psi_V}$ is controlled so as to have a specific magnitude and a specified position relative to the AC system flux vector $\overline{\Psi_e}$, or voltage vector $\overline{E}$ as described with reference to FIG. 2. This control forms the innermost control loop, and can be fast. For example, the speed of the control can be a few milliseconds. The AC system voltage vector, E, is obtained from instantaneous voltage measurements and is available locally. Voltage source inverter 350 can be a pulse width modulation (PWM) inverter.

Conventially, integration of large numbers of microsources into a system is not possible with basic P–Q controls; voltage regulation is necessary for local reliability and stability. Without local voltage control, systems with high penetrations of microsources can experience voltage and or reactive power oscillations. Voltage control must insure that there are no large circulating reactive currents between sources. The issues are identical to those involved in control of large synchronous generators. In the power grid, the impedance between generators is usually large enough to greatly reduce the possibility of circulating currents.

However, in a distribution system, which is typically radial, the problem of large circulating reactive currents is immense. With small errors in voltage set points, the circulating current can exceed the ratings of the microsources. Therefore, this situation requires a voltage vs. reactive current droop controller so that, as the reactive current generated by the microsource becomes more capacitive, the local voltage set point is reduced. Conversely, as the current becomes more inductive, the voltage set point is increased.

Figure 4:
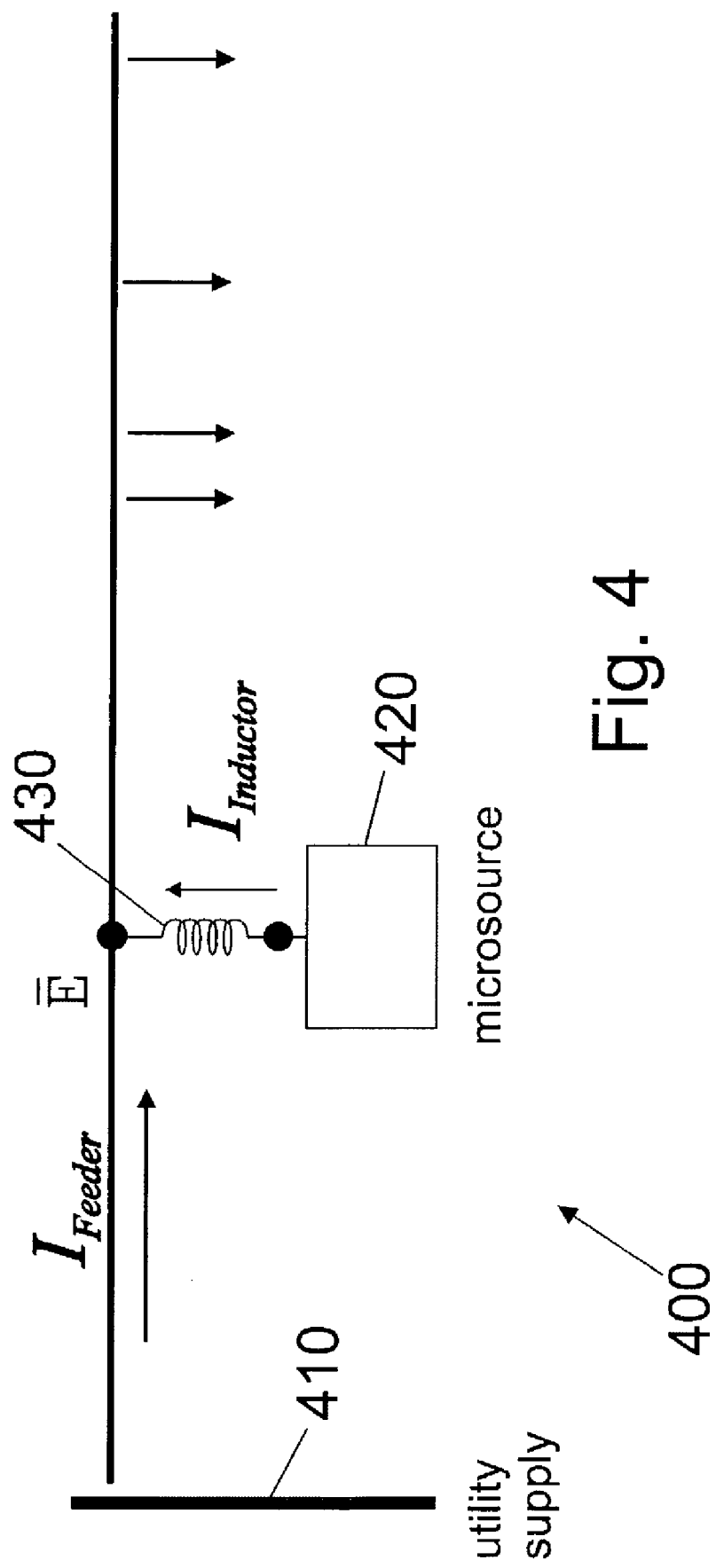
FIG. 4 is a diagrammatic representation of local system input states for a microsource in the distributed energy resource system of FIG. 1.

FIG. 4 illustrates a system 400 having local system input states. The system 400 includes a utility supply 410 providing a feeder current and a microsource 420 providing an inductor current through an inductor 430. In most cases, control of feeder power is the more stable mode of control. These input states are used by P & Q calculator 310 described with reference to FIG. 3 to calculate real and reactive power.

Figure 5:
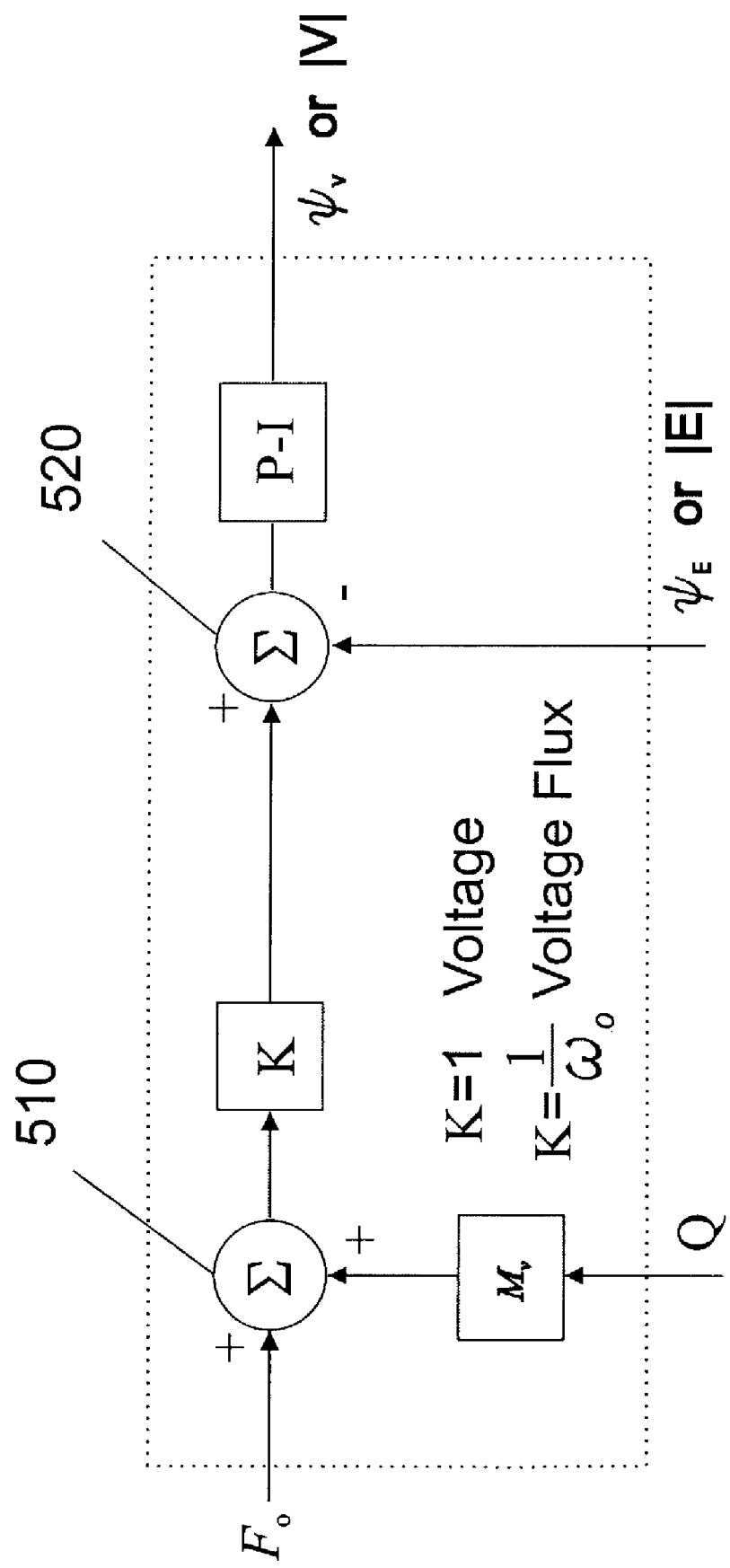
FIG. 5 is a diagrammatic representation of a voltage controller in an exemplary microsource system.

FIG. 5 illustrates a voltage controller 500. The voltage controller 500 can be the voltage controller 330 described with reference to FIG. 3. In an exemplary embodiment, there are three inputs to the voltage controller 500. One input is the voltage set point $E_o$. Another input is the reactive power being injected by the microsource, Q. A third input is the magnitude of the system voltage or voltage flux, $\psi_E$, or |E|. The slope of the voltage droop is defined by $M_v$ and the gain K depends on whether the inverter input assumes a voltage magnitude or voltage flux inputs. In an exemplary embodiment, K=1 for a voltage phasor and $$K = \frac{1}{\omega_o}$$

for a voltage flux.

In an exemplary embodiment, the voltage set point, $E_o$, is added to the product of the voltage droop slope, Mv, and the reactive power, Q, using a summer 510. The total of this sum is multiplied by a gain, K. The resulting product is added to the magnitude of the system voltage or voltage flux, |E| or $\psi_E$, using a summer 520. This voltage error is input to a PI (proportional plus integral) controller. The controller's output is a voltage magnitude or voltage flux, |V| or $\psi_V$. The voltage magnitude or voltage flux is provided to the inverter 350 described with reference to FIG. 3.

Figure 6:
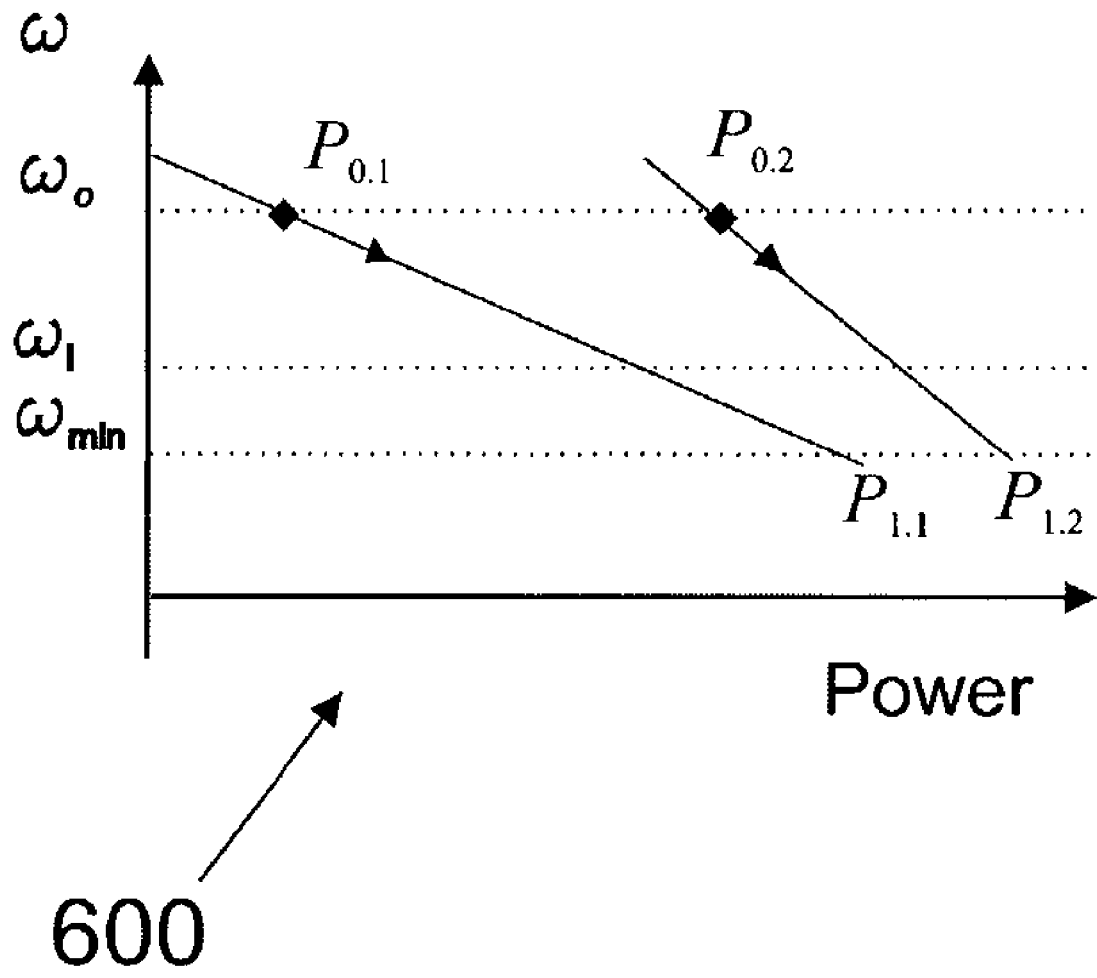
FIG. 6 is a graph of an exemplary voltage droop regulation characteristic when two machines are present.

FIG. 6 illustrates a graph 600 depicting an exemplary characteristic of droop regulation when only two machines are present. Machine 2 operates at higher output, than machine 1. As the system-enters island mode, the frequency is reduced. With the full load of the system, the new frequency is $\omega_{min}$, while if the system is at a lighter load, the new frequency is somewhere in between $\omega_o$ and $\omega_{min}$. The slower loop increases the frequency, $\omega$, upwards, until $\omega_1 - \omega_o$.

Figure 7:
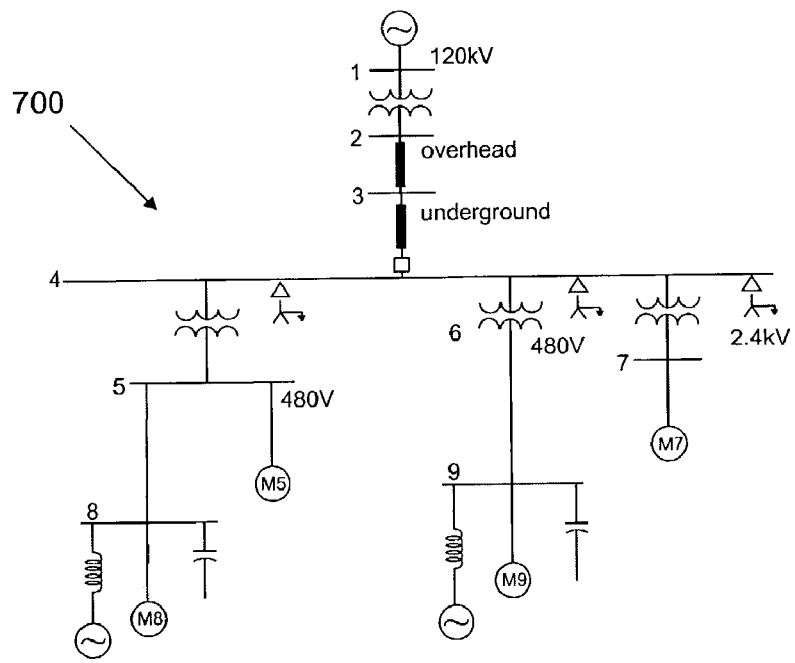
FIG. 7 is a diagrammatic representation of an industrial plant including microsource systems in accordance with an exemplary embodiment.

FIG. 7 illustrates an industrial plant 700 with high motor loads to illustrate the dynamics of the microsource controls described with reference to FIGS. 1–6. The example industrial plant 800 can have nearly 1.6 MW of motor load with motors ranging from 50 to 150 hp each. A 120 kV line provides power through a long 13.8 kV feeder consisting of overhead lines and underground cables. The plant has three main feeders: two at 480V and one at 2.4 kV. The loads on the 480-V feeders are critical and must continue to be served if utility power is lost. The induction machine clusters (M8 and M9) are connected to buses 8 and 9 with capacitive voltage support. Two clusters of microsources are also connected to buses 8 and 9 to provide power and voltage support. In the absence of locally generated power, the voltages of buses 8 and 9 are 0.933 and 0.941 per unit (pu, on 480-V base), respectively. Total losses are 70 kW. Each cluster of microsources is rated at 600 KVA and provides both power injection and local voltage support. The microsource power injection is approximately one half the total power. With these sources operating, the voltages on buses 8 and 9 are regulated at 1 pu, and the total losses drop to 6 kW, a reduction of 64 kW.

Figure 8:
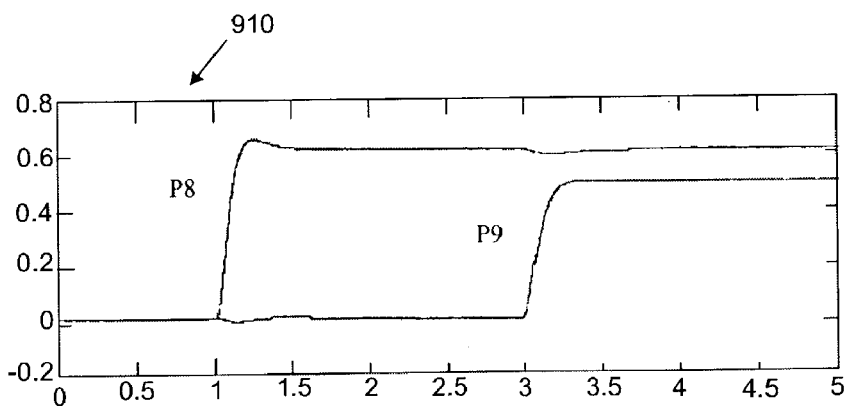
FIG. 8 is a diagrammatic representation of graphs of exemplary simulations of grid-connected operation of microsource systems in accordance with an exemplary embodiment.
Figure 8:
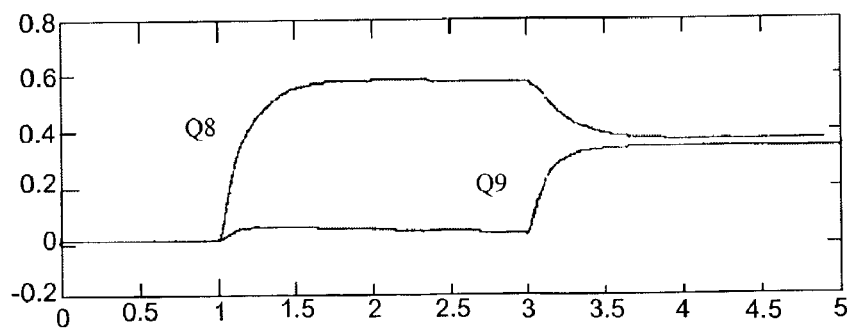
Figure 9:
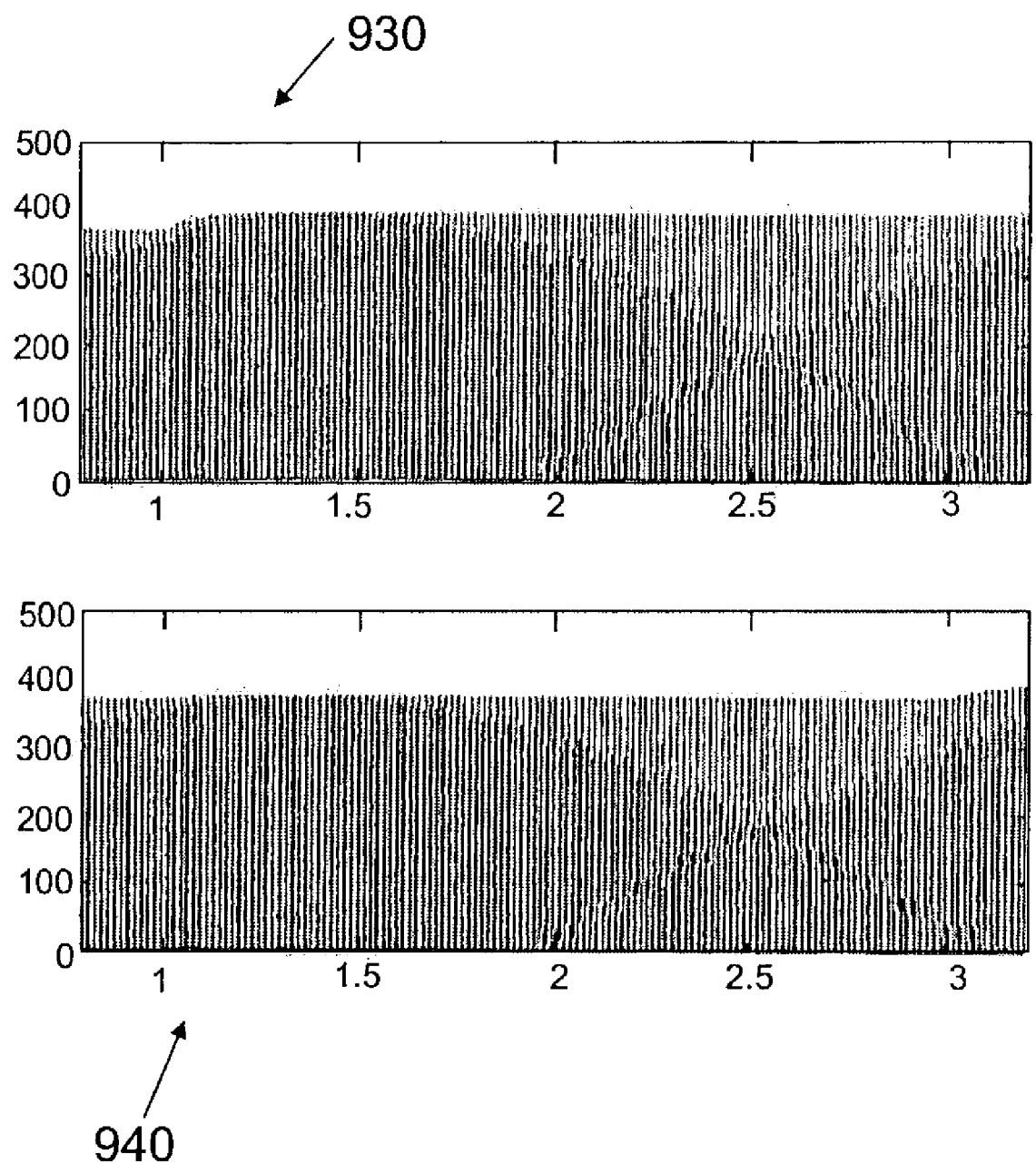
FIG. 9 is a diagrammatic representation of graphs of exemplary simulations of grid-connected operation of microsource systems in accordance with an exemplary embodiment.

FIGS. 8 and 9 illustrate graphs 910, 920, 930, and 940 depicting exemplary simulations of grid-connected operation. In the initial state, local sources are not generating power, so FIG. 9 shows zero real and reactive power injection and reduced voltages on buses 8 and 9. At t=one second, the generators at bus 8 are brought on line with a power setting of 446 kW and local voltage control. Note the voltage correction in graph 930 of FIG. 9.

At t=three seconds, the units at bus 9 are brought on line with a power set point of 360 kW and local voltage control. FIG. 9 shows the active and reactive power injections at the buses where units are located. As the second microsource is brought on line, the Q injection at bus 8 to maintain local voltage magnitude drops. FIG. 9 shows half of the voltage envelope at the regulated buses during the start-up sequence. Voltage on bus 9 is controlled to 1 pu within a few cycles.

This example can also be used to simulate island operation with power sharing through droop. It is assumed that the ratings of the microsources are not adequate to supply the total load. The two 480-V feeders supply critical loads, and the M7 load on bus 7 can be dropped using breaker $S_2$ (see FIG. 7).

Figure 10:
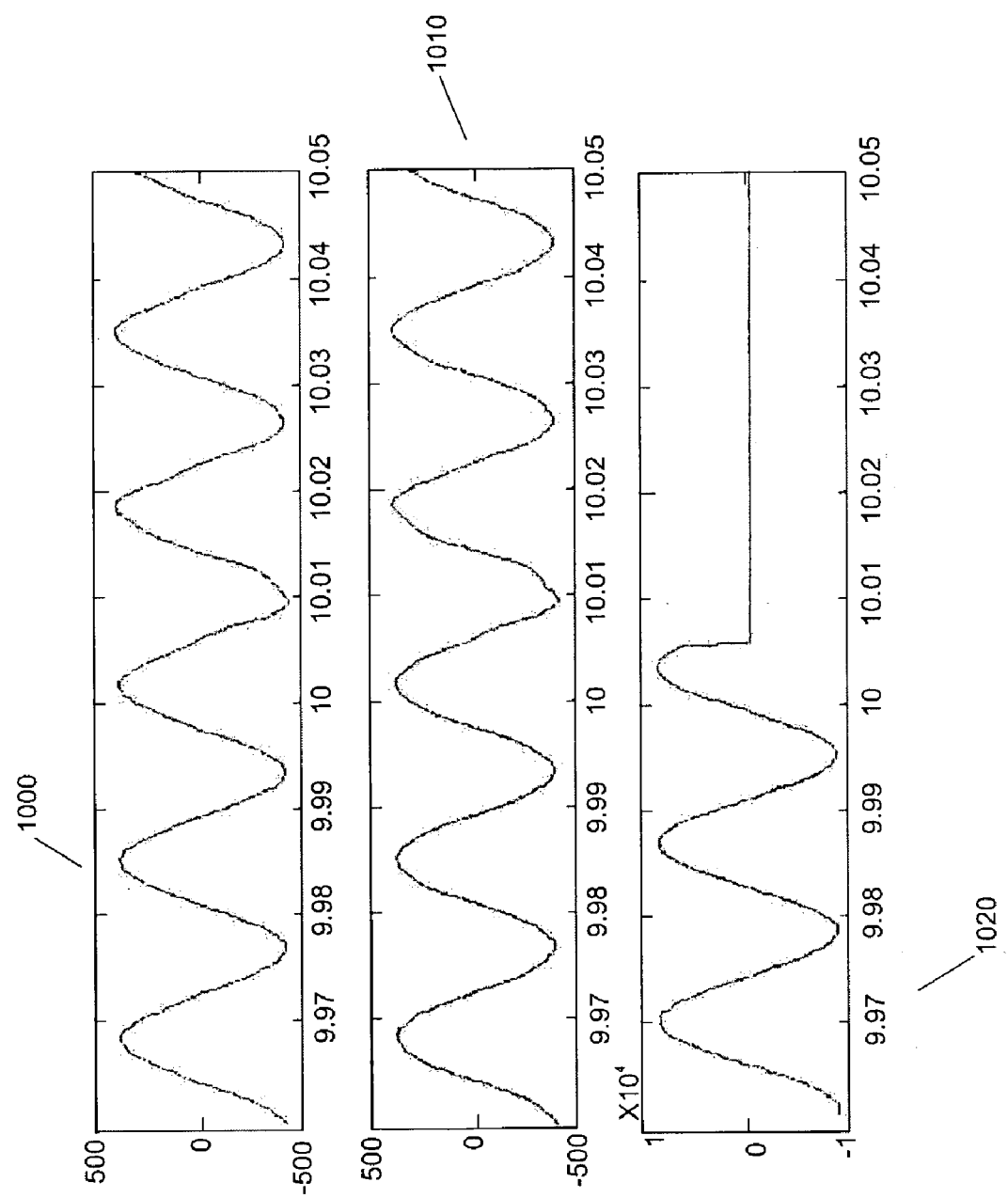
FIG. 10 is a diagrammatic representation of graphs of regulated voltages during an exemplary transfer to island operation in accordance with an exemplary embodiment.

FIG. 10 illustrates graphs 1000, 1010, and 1020 depicting regulated voltages during an exemplary transfer to island operation for bus 8 (graph 1000), for bus 9 (graph 1010), and for a 13.8 kV feeder (graph 1020). At t=10 seconds, the system moves from grid-connected to island operation by the tripping of switch $S_1$ (FIG. 7) in response to supply problems (graph 1020). At the same time, the non-critical feeder is dropped using $S_2$. Waveforms for bus 8 and 9 voltages during the switch to island mode are shown in graphs 1000 and 1010. As shown in the graph, there is only a slight change from the sinusoidal steady state after t=10 seconds and the change lasts less than a cycle.

Figure 11:
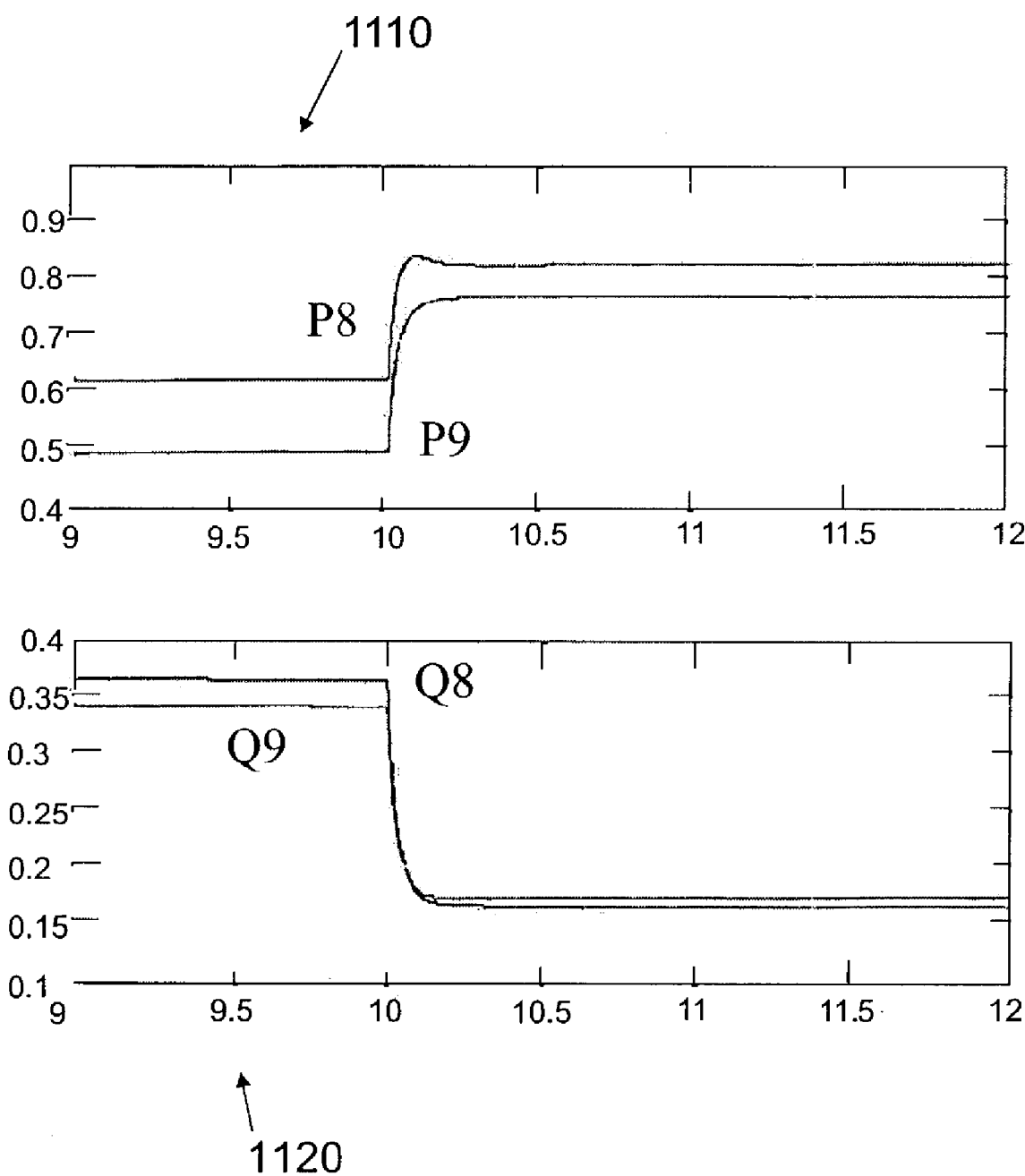
FIG. 11 is a diagrammatic representation of graphs of active and reactive power changes during an exemplary transition.

FIG. 11 illustrates graphs 1110 and 1120 depicting changes in active and reactive power during an exemplary transition. Active power has to take up the critical load in the absence of grid power. Both machine clusters increase their power injection as expected from the design of the droop characteristics. The machine with lighter load at bus 9 picks up the largest part of the new load demands, as seen in the graph 1110. Reactive power injection reduces but holds the voltages at 1 pu. Power regulation takes place very rapidly, and steady-state power is restored in less than one second. In this case, system frequency droops a little more than 0.5 Hz. Meanwhile, the frequency restoration loop has started and restores the frequency to 60 Hz.

As described with reference to FIGS. 1–11, a local controller at each microsource can insure stable operation in an electrical distribution system. This controller can respond in milliseconds and use local information to control the microsource during all system or grid events. Advantageously, communication among microsources is not necessary for basic system operation; each inverter is able to respond to load changes in a predetermined manner without data from other sources or locations. This arrangement enables microsources to "plug and play." That is, microsources can be added without changes to the control and protection of units that are already part of the system.

The power controller 340 in FIG. 3 is described with reference to FIGS. 12–18 as a specific approach for implementation. Other approaches can also be used with the systems and methods described.

As previously described, a microsource interfaces a network through an inverter that is connected to the local feeder by an impedance X. A controller can regulate feeder voltage and active power to desired values. The control is designed so that it also allows operation during island mode. When the local microgrid is no longer connected to the main grid because of a failure, the microsources redispatch their output power to new values, consistent with the fact that all the loads in the microgrid have to be supplied with electrical energy, knowing that the power grid injection is zero.

To better understand an implementation of the power controller, a detailed implementation of the flux vector calculator 320 in FIG. 3 is described. The voltages, E, in the time domain are projected in a stationary frame by means of the following equations:

$$e_{ds}(t) = \frac{e_c(t) - e_b(t)}{\sqrt{3}}$$ Eq. (14)

$$e_{qs}(t) = \left(\frac{2}{3}\right)\left(e_a(t) - \frac{1}{2}e_b(t) - \frac{1}{2}e_c(t)\right)$$

These voltages are integrated to yield the components of the quantity called voltage vector flux. It is possible to transform these rectangular coordinates to polar quantities by means of the following equations:

$$\Psi_{ed} = \int_{-\infty}^{t} e_{ds}(\tau)d\tau \quad |\Psi_e| = \sqrt{\Psi_{ed}^2 + \Psi_{eq}^2}$$ Eq. (15)
$$\Psi_{eq} = \int_{-\infty}^{t} e_{qs}(\tau)d\tau \quad \delta_e = -\tan^{-1}\left(\frac{\Psi_{ed}}{\Psi_{eq}}\right)$$

The measure of the angle is given by the inverse tangent of the ratio of the components, with a reversed sign, to keep into account the choice of the direction of the axis d and q. By itself, the arctangent yields values that are between $-\pi/2$ and $\pi/2$, as the ratio of the rectangular components change. To be precise, it is worth noticing that $\tan(x)=\tan(x+\pi)=y$. When the arctangent of 'y' is taken, it is not known which one angle (x or $x+\pi$) is the current solution. To solve this problem, the sign of the cosine component of the voltage flux can be monitored. A negative component means that the arctangent output has to be added to $\pi$. To make this issue more transparent, this operation can be embedded in the sawtooth, adding a $\pi$ whenever it is needed. The result of this manipulation yields a sawtooth that is not bound between $-\pi/2$ and $\pi/2$, but rather from $-\pi/2$ and $3\pi/2$. Notice that this is the angle of the flux of the voltage vector. This vector, being the integral of the stationary frame voltage vector, is $\pi/2$ delayed with respect of the voltage vector itself. To obtain the value of the voltage angle, $\pi/2$ is added to the angle of the flux vector. The bounds of the sawtooth wave of the arctangent are no longer $-\pi/2$ and $3\pi/2$, but rather O and $2\pi$, in accordance with the fact that $\pi/2$ is added to obtain the sawtooth relative to the angle of the voltage.

Since the angle of the voltage flux increases in time with rate $\omega_o$, the arctangent assumes a sawtooth trend. As such, if the angle, $\delta_e$, of the voltage flux is found by wrapping up the sawtooth wave to yield a function growing with rate $\omega_o$, then sooner or later the number representing this function requires more bits than may be available inside a programmable logic DSP.

Figure 12:
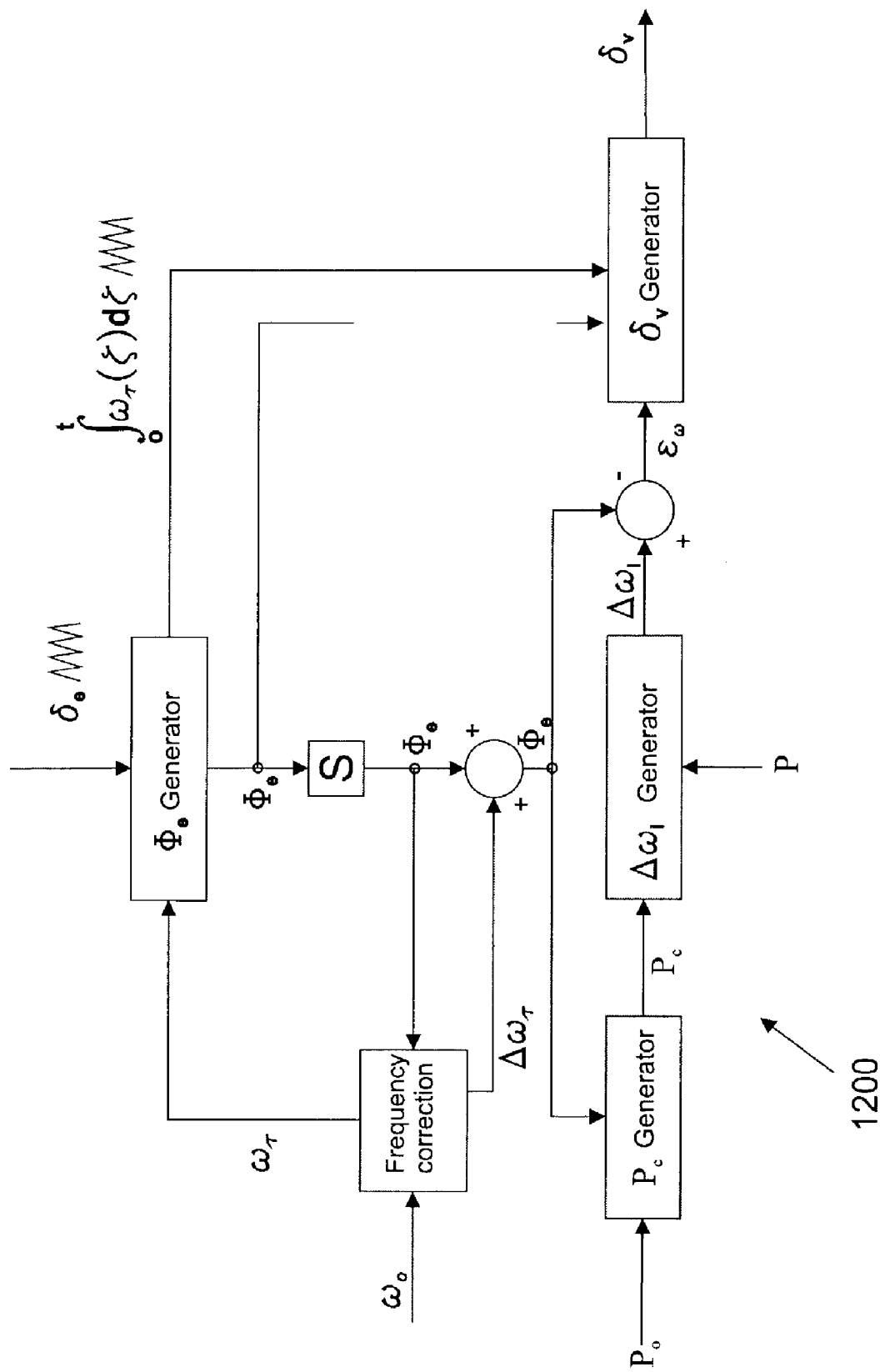
FIG. 12 is a diagrammatic representation of an exemplary control system having power-frequency droop control.

FIG. 12 illustrates a power controller system 1200 having power-frequency droop control. Power-frequency droop control maintains the active power injection to a constant value, $P_o$, during normal operation while redispatching output power during islanding to maintain supply at the loads, providing the extra quota of power that was once injected by the grid. Inputs to the system 1200 can include the power request $P_o$, the current measure of the active power, and the nominal network frequency, $\omega_o$. The output is the inverter voltage angle, or the desired angle that the inverter has to synthesize at its own terminals.

In FIG. 12, there is a sawtooth icon near $\delta_e$ and near the integral of the quantity $\omega_\tau$; meaning that those variables are not growing constantly in time, but rather are wrapped between limited values.

The derivative of $\Phi_e$ is calculated in real time and filtered to ensure that a bounded quantity is manipulated. During transients ensuing from changes in commands or from transfer to island, it is possible that the derivative of the signal $\Phi_e$ may have a high frequency content, associated with possible large instantaneous values. The control is filtered to avoid using such a quantity in the control. The filter has a time constant of one tenth of a second, making it fast enough to track changes and yet, effective in obtaining well behaved outputs even in the face of transients.

Figure 13:
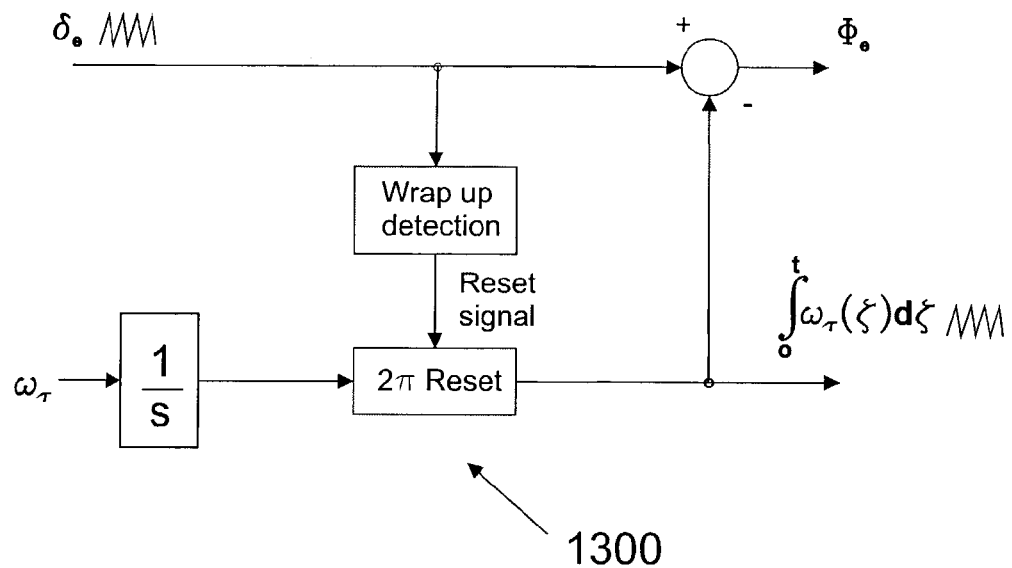
FIG. 13 is a diagrammatic representation of an $\Phi_e$ generator system in the control system of FIG. 12.

FIG. 13 illustrates operations of the $\Phi_e$ generator block of the control system 1200 described with reference to FIG. 12. This generator is responsible for generating a voltage angle that is always constant in steady state. The inputs of the $\Phi_e$ are the sawtooth wave for the regulated bus voltage, ranging from 0 to $2\pi$ and the corrected frequency $\omega_\tau$. The outputs are the steady state constant quantity $\Phi_e$ and the sawtooth of the integral in time of $\omega_\tau$. To appreciate the meaning of the operations of the $\omega_e$ generator, it is important to define some quantities. The sawtooth quantity representing the voltage angle coming from the measurement is:

$$\delta_e = \omega_o t + \phi_e(t) \qquad \text{Eq. (16)}$$

When connected to the grid and in steady state, $\phi_e(t)$ is a constant. In island mode, however, this angle is worth:

$$\varphi_e(t) = \int_0^t \Delta\omega_n(\varsigma)d\varsigma + \Phi_e \qquad \text{Eq. (17)}$$

A difference is experienced because the frequency instantly drops during regulation and is restored to a value slightly smaller than $\omega_o$. The value $\Delta\omega_n(t)$ is the measure of the difference between the actual frequency and the nominal value. Therefore:

$$\Delta\omega_n = \omega_n - \omega_o < 0 \qquad \text{Eq. (18)}$$

The derivative of $\phi_e$ is:

$$\frac{d\varphi_e}{dt} = \Delta\omega_n \qquad \text{Eq. (19)}$$

In steady state, the quantity $\Delta\omega_n$ is a constant, but during transients it is a function of time. As such, to obtain the angle change, an integration is performed (as in Eq. 17).

To obtain $\Phi_e$ from Eq. 16, an appropriate quantity is subtracted from the sawtooth wave. From Eq. 17, Eq. 16, and Eq. 5:

$$\delta_e = \omega_o t + \int_0^t \Delta\omega_n(\varsigma)d\varsigma + \Phi_e = \qquad \text{Eq. (20)}$$
$$\int_0^t (\omega_o + \Delta\omega_n(\varsigma))d\varsigma + \Phi_e = \int_0^t \omega_n(\varsigma)d\varsigma + \Phi_e$$

This yields:

$$\Phi_e = \delta_e - \int_o^t \omega_n(\varsigma)d\varsigma \qquad \text{Eq. (21)}$$

$\Phi_e$ can change during the transient subsequent to the transition to island, but in steady state, a value for $\Phi_e$ is measured that is constant. As such, the integral of $\omega_n$ is not subtracted but the integral of $\omega_\tau$ is. This quantity is created by adding $\omega_o$ not with $\Delta\omega_n$ (that would yield $\omega_n$), but rather $\Delta\omega_\tau$ which is a delayed signal of $\Delta\omega_n$:

$$\Delta\omega_\tau = \frac{1}{1+\tau s}\Delta\omega_n \qquad \text{Eq. (22)}$$

In this case, $\tau$ is a time constant that determines how quickly the delayed deviation of speed reaches the new steady state value of $\Delta\omega_n$. The larger the time constant, the longer it takes. Preferably, the speed should not be too fast to ensure that only the DC changes in $\Delta\omega_n$ are tracked, while completely filtering out any small transient deviation from nominal. This time constant is preferably in the range of 10 seconds or more.

Whatever sustained non-zero difference of frequency from the nominal is present, then this equation generates a signal that in time is equal to that amount. Thus, $$\omega_\tau = \omega_o + \Delta\omega_\tau, \text{ with } \Delta\omega_\tau < 0 \qquad \text{Eq. (23)}$$

and Eq. 21 reduces to the following relation:

$$\Phi_e = \delta_e - \int_o^t \omega_\tau(\varsigma)d\varsigma \qquad \text{Eq. (24)}$$

In this case any instant discrepancy in frequency is not removed (operation performed in Eq. 21), but the sustained, steady state value of the difference in frequency (Eq. 24) is removed as encountered in island mode operation.

Details of the $\Phi_e$ generator are illustrated in FIG. 13. As illustrated in FIG. 13, a sawtooth wave can be generated from the integral of $\omega_\tau$. This wave can be generated by resetting the integral back of $2\pi$ each time the waveform $\delta_e$ is reset of $2\pi$. The value of $\Phi_e$ is obtained by subtracting the generated sawtooth from the sawtooth coming from the measure of $\delta_e$ (Eq. 24). The wave $\delta_e$ grows with rate $\omega_n$ while the generated sawtooth grows with rate $\omega_\tau$. This means that the two rates coincide in steady state (Eq. 22), yielding $\Phi_e$ constant, but during transients the derivative of $\Phi_e$ is different from zero.

Figure 14:
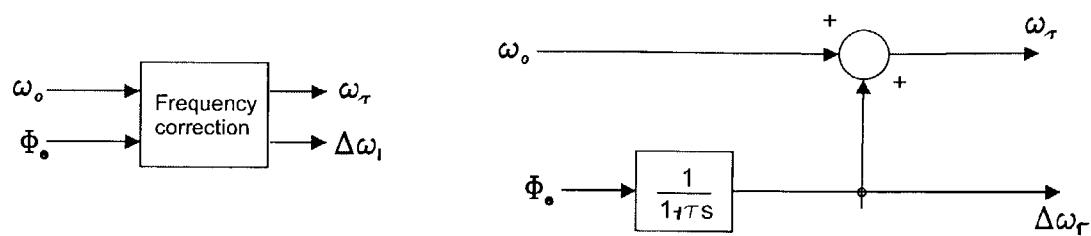
FIG. 14 is a diagrammatic representation of an exemplary frequency correction system in the control system of FIG. 12.

FIG. 14 illustrates operations of the frequency correction block of the control system 1200 described with reference to FIG. 12. The frequency correction block is responsible to create a delayed signal $\Delta\omega_\tau$ that tracks in steady state the value of $\Delta\omega_n$. From Eq. 20 it is possible to see that a transient change is manifest in a non-zero derivative of $\Phi_e$ but in steady state (when $\Delta\omega_\tau = \Delta\omega_n$), then the derivative of $\Phi_e$ is zero.

The expression that allows the tracking of the quantity $\Delta\omega_n$ is shown in Eq. 22 and in the block diagram of FIG. 14. It is now possible to see how the correction takes place.

From Eq. 19 and FIG. 12:

$$\frac{d\varphi_e}{dt} = \Delta\omega_n = \frac{d\Phi_e}{dt} + \Delta\omega_\tau \qquad \text{Eq. (25)}$$

Note that the outside world is only aware of the term $$\frac{d\varphi_e}{dt},$$

therefore there is no way to notice that the correction takes place. Indeed, the correction can be thought as a way to book-keep the derivative. From Eq. 25 it appears that at the beginning $\Delta\omega_n$ shows up entirely in the term $$\frac{d\Phi_e}{dt},$$

but in steady state it is all in the term $\Delta\omega_\tau$ (forcing $\frac{d\Phi_e}{dt} = 0$).

The sum of the two is always the same, which is why an observer outside this block cannot notice that the signal has been split in these two quantities.

Figure 15:
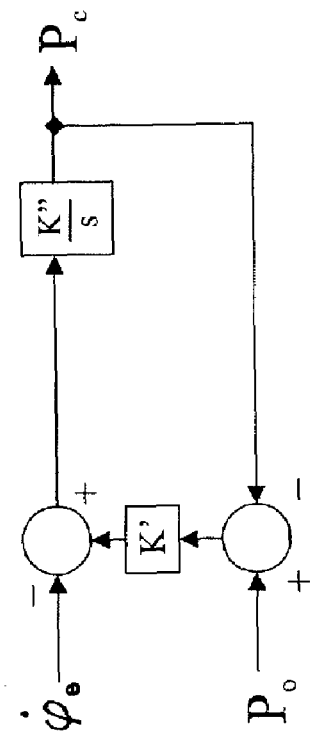
FIG. 15 is a diagrammatic representation of an exemplary $P_c$ generator system in the control system of FIG. 12.

FIG. 15 illustrates the $P_c$ generator block from FIG. 12. The $P_c$ generator block is responsible to correct the frequency back to a value near $\omega_o$ after the islanding and the transient ensuing might have taken the frequency to a value that is too far away from $\omega_o$ to be sustained for more than a small amount of time.

In grid connection, $\Delta\omega_n = \Delta\omega_\tau = 0$ in steady state, since the frequency is commanded to be $\omega_o$. This means (from Eq. 25) that the term $$\frac{d\Phi_e}{dt} = 0,$$

since in steady state the input of the integral must be zero. Thus, $P_c = P_o$, which is the desired power. During islanding, the input of the integral must be zero, but now $P_c \neq P_o$. This means that:

$$\Delta\omega_n = K'(P_o - P_c) \qquad \text{Eq. (26)}$$

With a given term $P_o - P_c$, K' is smaller and is responsible for deviation in frequency at steady state from the nominal value. The constant K" is responsible for the change of $P_C$ after the transfer to island. The larger K" is, the quicker the frequency is restored to a value near to $\omega_o$. These constants are related to the droop characteristic slope 'm' by the following relations:

$$K' = -a\,m$$

$$K'' = -\frac{b}{m}$$

Different microsources have different values for 'm', but they share the same real positive scalar coefficients 'a' and 'b'. This constraint is derived from the fact that during frequency restoration, the frequency must rise at the same rate everywhere in the isolated microgrid to maintain the same active power dispatching level. In other words, if the frequency does not rise with the same rate, then different points in the microgrid end up at different frequencies and therefore the active power dispatch changes as a consequence of this. It is desirable to maintain the same level of dispatched power during frequency recovery, hence the same scalars are needed in all the units of the microgrid.

Figure 16:
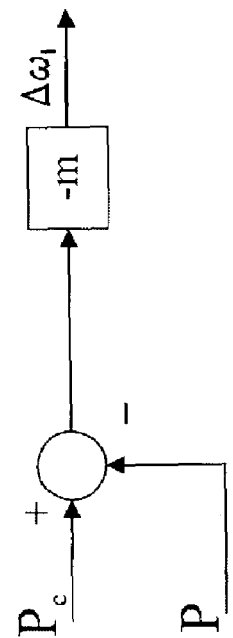
FIG. 16 is a diagrammatic representation of an exemplary $\Delta\omega_i$ generator system in the control system of FIG. 12.

FIG. 16 illustrates a $\Delta\omega_i$ generator block (see FIG. 12). The quantity $\Delta\omega_i$ is the desired discrepancy in frequency from the nominal value commanded by the inverter. Whenever connected to the grid, $\Delta\omega_i$ is zero in steady state, but during transients it is non-zero to allow for a change in the voltage angle. During island operation, $\Delta\omega_i$ is non-zero in steady state, assuming:

$$\Delta\omega_i = \Delta\omega_n = \frac{d\varphi_e}{dt} = \Delta\omega_\tau. \qquad \text{Eq. (27)}$$

Figure 17:
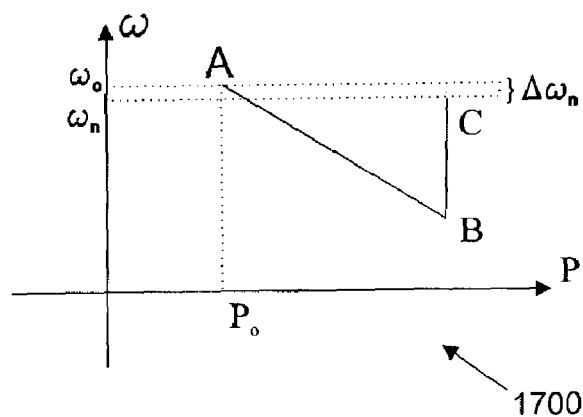
FIG. 17 is a graph of an exemplary power-frequency droop.

The signal $\Delta\omega_i$ is generated according to the power-frequency droop characteristic. FIG. 17 illustrates a graph 1700 of the power-frequency droop. It is possible to see that whenever the frequency is locked to $\omega_o$ by the grid, then the output power matches the desired setpoint, $P_o$. During island mode, the frequency is no longer locked and it is used by the different microsources to reach a new steady state point, with higher output power (to compensate for the missing power from the grid) and at a lower frequency. As such, all the units in the isolated microgrid will operate at the same new, reduced frequency.

Referring again to FIG. 16, when connected to the grid, $P_c = P_o$ and $\Delta\omega_i = 0$ in steady state. As soon as the transfer to island occurs, the frequency drops, but then the signal $P_c$ is increased by the integrator K"/s to a new value such that Eq. 26 is satisfied. As $P_c$ is increases, $\Delta\omega_i$ is reduced and this desired discrepancy in frequency is reflected in Eq. 26 by the measured term $\Delta\omega_n$ as the inverter generates a $\Delta\omega_1$ at its own terminals. Here, $\Delta\omega_i$ equals:

$$\Delta\omega_i = -m(P_c - P) \qquad \text{Eq. (28)}$$

The coefficient 'm' is a negative scalar given by the following relation:

$$m = \frac{\omega_o - \omega_{\min}}{P_o - P_{\max}}$$

where $\omega_o$ is the nominal angular frequency of the grid, $\omega_{min}$ is the minimum value allowed for the angular frequency to sag to, $P_o$ is the value that the active power has at the nominal frequency (that is, when there is a connection with the grid) and $P_{max}$ is the maximum rated power of the machine, which is reached when the frequency is at the minimum level. Different machines can have different values of 'm', depending upon their rating ($P_{max}$) and on their current operating point ($P_o$). Looking at FIG. 17, it is possible to understand what these values mean: $\omega_o$ and $P_o$ represent the operating point with the grid (point A), while $\omega_{min}$ and $P_{max}$ is the other point that defines a slope for the characteristic. This second point is an extreme of the range of operation, the point B usually has $\omega_{min}<\omega_B<\omega_o$ and $P_{max}>P_B>P_o$.

As a side note, notice that if the block that generates $P_c$ were missing, then $P_c$ would be replaced by $P_o$ all the time, and the frequency would stay in steady state at the low value reached during redispatching (point B), without possibility of restoration. In other words, with the signal $P_c$, an islanding event can be traced on the P-ω plane (FIG. 17) as a trajectory that moves from A (steady state with grid) to B when islanding occurs (and the restoration process is activated), to C, when the new steady state in island mode is reached. Notice that the part from A to B is described by a linear equation with rate of growth 'm', which is a negative number.

Figure 18:
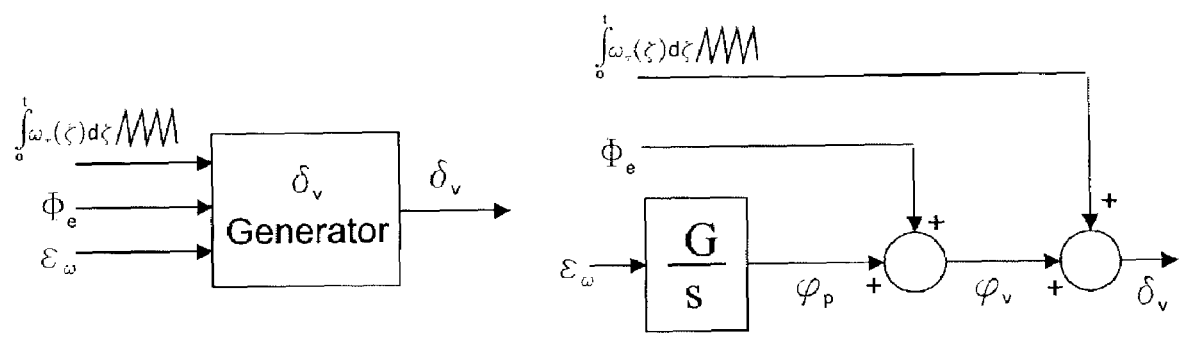
FIG. 18 is a diagrammatic representation of an exemplary $\delta_v$ generator system in the control system of FIG. 12.

FIG. 18 illustrates a $\delta_v$ generator which is the part of the control responsible for generating the voltage angle that is synthetized at the inverter terminals. Once the signal $\Delta\omega_i$ has been generated, it is subtracted from the measured $$\Delta\omega_n = \frac{d\varphi_e}{dt}$$

to yield the error in frequency. This error commands the angle to increase or decrease in order to catch up with the desired instantaneous desired frequency.

This error is integrated through a gain to yield the difference in angle between the voltage at the inverter and the voltage at the regulated bus. This angle, $\phi_p$, is constant during steady state regardless whether connected to grid or not. Regardless of the frequency that the voltages are rotating, in steady state the difference of their phases is constant. This means that the error $\epsilon_\omega$ is zero in steady state, consistent with the fact that desired deviation in speed ($\Delta\omega_i$) and actual deviation ($\Delta\omega_n$) are the same in steady state regardless if we are in grid mode ($\Delta\omega_i=0$) or in island ($\Delta\omega_i\neq 0$).

The angle ($\Phi_p$ is added to the angle $\Phi_e$ to yield the quantity $\phi_v$, by adding the integral of $\omega_\tau$ then we obtain $\delta_v$:

$$\delta_v = \int_o^t \omega_\tau(\varsigma)d\varsigma + \Phi_e + \varphi_p \quad \text{Eq. (29)}$$

By substituting Eq. 25 into Eq. 16 we get:

$$\delta_e = \omega_o t + \int_o^t \frac{d\varphi_e(\varsigma)}{d\varsigma}d\varsigma = \omega_o t + \int_o^t \left[\Delta\omega_\tau(\varsigma) + \frac{d\varphi_e(\varsigma)}{d\varsigma}\right]d\varsigma = \quad \text{Eq. (30)}$$
$$= \omega_o t + \int_o^t \Delta\omega_\tau(\varsigma)d\varsigma + \Phi_e = \int_o^t \omega_\tau(\varsigma)d\varsigma + \Phi_e$$

Comparison between Eq. 29 and 30 shows that these two angles are exactly ($\phi_p$ apart from each other. A PWM inverter is interested in knowing the angle $\phi_v$, sum of $\Phi_e$ and $\phi_p$. An inverter implementing space vector technique uses the signal $\delta_v$.

While the exemplary embodiments illustrated in the figures and described above are presently preferred, it should be understood that these embodiments are offered by way of example only. Other embodiments may include, for example, different techniques for power calculation, voltage control, power control, or droop control. The invention is not limited to a particular embodiment, but extends to various modifications, combinations, and permutations that nevertheless fall within the scope and spirit of the appended claims.

What is claimed is:

1. A microsource system providing power in any one of an isolation mode and a grid mode and being configured to couple to a power system without modification of existing equipment in the power system, the microsource system comprising:
   a microsource power source configured to provide electrical power; and
   a controller comprising a voltage controller and a power controller, wherein the voltage controller and the power controller are coupled to the microsource power source to control the microsource power source based only on information available locally at the microsource power source, and further wherein the voltage controller and the power controller receive inputs from a real power and reactive power calculator and from a flux vector or phasor calculator.

2. The micro source system of claim 1 wherein the real power and reactive power calculator receive inputs from voltage at a connection point, current injected by the microsource power source, and current in a feeder from a utility supply.

3. The microsource system of claim 1 wherein the power controller includes a frequency droop governor where if frequency ($\omega_i$) decreases below $\omega_o$ power increases linearly by a coefficient m.

4. The microsource system of claim 1 wherein the microsource power source is a fuel cell.

5. The microsource system of claim 1 wherein the microsource power source is a microturbine.

6. The microsource system of claim 1 wherein the controller reduces a local voltage set point as reactive current generated by the microsource power source becomes more capacitive.

7. The microsource system of claim 1 wherein the controller increases a local voltage set point as current generated by the microsource power source becomes more inductive.

8. The microsource system of claim 1 wherein the microsource power source includes a prime mover, a DC interface, and a voltage source inverter.

9. A micro source system configured for use in a microgrid which is capable of separation from a power grid while continuing to operate independently when problems occur and reconnecting to the power grid once the problems are solved, the system comprising:
   a microsource including a prime mover, a DC interface, and a voltage source inverter;
   means for controlling real and reactive power coupled to the microsource;
   means for regulating voltage through droop control to the microsource;
   means for providing real power and reactive power inputs to the voltage regulating means and the power controlling; and
   means for providing flux vector or phasor inputs to the voltage regulating means and the power controlling means.

10. The system of claim 9 further comprising means for fast load tracking and storage coupled to the microsource.

11. The system of claim 9 further comprising means for frequency droop control for power sharing coupled to the microsource.

12. The system of claim 9 wherein the means for regulating voltage through droop reduces a local voltage set point as reactive current generated by the microsource becomes more capacitive.

13. The system of claim 9 wherein the means for regulating voltage through droop increases a local voltage set point as current generated by the microsource becomes more inductive.

14. A power system comprising:
a microsource including a voltage source inverter, the microsource being configured to connect to a utility grid, the utility grid coupling a plurality of power sources; and
a controller comprising a voltage controller and a power controller, wherein the voltage controller and the power controller are coupled to the voltage source inverter and configured to control reactive and active power independently from the plurality of power sources coupled to the utility grid, and further wherein the voltage controller and the power controller receive inputs from a real power and reactive power calculator and from a flux vector or phasor calculator.

15. The power system of claim 14 wherein the microsource includes a high frequency AC source that is rectified.

16. The power system of claim 14 wherein the microsource includes a DC battery storage source.

17. The power system of claim 14 wherein the controller includes a droop controller.

18. The power system of claim 17 wherein the droop controller comprises means for reducing a local voltage set point as reactive current generated by the microsource becomes more capacitive; and
means for increasing the local voltage set point as current generated by the microsource becomes more inductive.

19. A method of controlling a microsource in a microgrid system where the microgrid can operate independently from a power grid or in cooperation with the grid, the method comprising:
receiving inputs from voltage at a connection point, current injected by the microsource, and current in a feeder from a utility supply;
providing the inputs to a real power and reactive power calculator;
controlling voltage and power of the microsource using the real power and reactive power calculator;
reducing a local voltage set point as current injected by the microsource becomes more capacitive; and
increasing the local voltage set point as current generated by the microsource becomes more inductive.

20. The method of claim 19 wherein controlling the power of the microsource includes using a frequency governor.

21. The method of claim 19 wherein constant power is provided during microgrid connected mode.

22. The method of claim 19 wherein dynamic load tracking is provided during island mode.

23. A microsource system providing power in any one of an isolation mode and a grid mode and being configured to couple to a power system without modification of existing equipment in the power system, the microsource system comprising:
a microsource power source configured to provide electrical power; and
a controller comprising a voltage controller and a power controller, wherein the voltage controller and the power controller are coupled to the microsource power source to control the microsource power source; and
a real power and reactive power calculator, wherein the real power and reactive power calculator provides a first set of inputs to the voltage controller and the power controller, and further wherein the real power and reactive power calculator receives a second set of inputs from voltage at a connection point, current injected by the microsource power source, and current in a feeder from a utility supply.

* * * * *

UNITED STATES PATENT AND TRADEMARK OFFICE
CERTIFICATE OF CORRECTION

PATENT NO. : 7,116,010 B2
APPLICATION NO. : 10/245729
DATED : October 3, 2006
INVENTOR(S) : Robert H. Lasseter and Paolo Piagi It is certified that error appears in the above-identified patent and that said Letters Patent is hereby corrected as shown below:

Column 1, Line 38: Delete "customers" and replace with --customers'--.

Column 1, Line 40: Delete "customers" and replace with --customers'--.

Column 2, Line 23: Delete the phrase "less 10μm" and replace with --less than 10μm--.

Column 2, Line 52: Delete "customers" and replace with --customer's--.

Column 6, Line 54: Delete "generators" and replace with --generators'--.

Column 6, Line 58: Delete "generators" and replace with --generators'--.

Column 8, Line 24: Delete "$\psi_E$" and replace with -- $\Psi E$ --.

Column 8, Line 26: Delete "$\psi_v$" and replace with -- $\Psi v$ --.

Column 8, Line 34: Delete "$\omega_{min}$" and replace with -- $\omega min$ --.

Column 8, Line 35: Delete "$\omega_o$" and replace with -- $\omega o$ --.

Column 8, Line 35: Delete "$\omega_{min}$" and replace with -- $\omega min$ --.

Column 8, Line 36: Delete "$\omega$" and replace with -- $\omega$ --.

Column 8, Line 36: Delete "$\omega 1 \approx \omega_o$" and replace with -- $\omega 1 \approx \omega o$ -- as.

Column 14, Line 42: Delete "is increases," and replace with --is increased--.

Column 15, Line 40: Delete "($\Phi_p$" and replace with -- $\Phi_p$ --.

UNITED STATES PATENT AND TRADEMARK OFFICE
CERTIFICATE OF CORRECTION

| | |
|---|---|
| PATENT NO. | : 7,116,010 B2 |
| APPLICATION NO. | : 10/245729 |
| DATED | : October 3, 2006 |
| INVENTOR(S) | : Robert H. Lasseter and Paolo Piagi |

It is certified that error appears in the above-identified patent and that said Letters Patent is hereby corrected as shown below:

<u>Column 15, Line 58:</u>  Delete "($\phi_p$" and replace with -- $\phi_p$ --.

Signed and Sealed this

Third Day of April, 2007

JON W. DUDAS
*Director of the United States Patent and Trademark Office*